(12) United States Patent
Pitts et al.

(10) Patent No.: US 12,309,212 B2
(45) Date of Patent: *May 20, 2025

(54) SAFE AND PRIVACY PRESERVING VIDEO REPRESENTATION

(71) Applicant: Google LLC, Mountain View, CA (US)

(72) Inventors: Colvin Pitts, Snohomish, WA (US); Yukun Zu, Shoreline, WA (US); Xuhui Jia, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/591,787

(22) Filed: Feb. 29, 2024

(65) Prior Publication Data
US 2024/0205278 A1      Jun. 20, 2024

Related U.S. Application Data

(63) Continuation of application No. 17/459,964, filed on Aug. 27, 2021, now Pat. No. 11,949,724.

(51) Int. Cl.
| | |
|---|---|
| *G06T 11/00* | (2006.01) |
| *G06V 20/40* | (2022.01) |
| *G06V 40/20* | (2022.01) |
| *H04L 9/40* | (2022.01) |
| *H04L 65/403* | (2022.01) |
| *H04N 5/272* | (2006.01) |

(52) U.S. Cl.
CPC ............ *H04L 65/403* (2013.01); *G06T 11/00* (2013.01); *G06V 20/41* (2022.01); *G06V 40/20* (2022.01); *H04L 63/105* (2013.01); *H04N 5/272* (2013.01)

(58) Field of Classification Search
None
See application file for complete search history.

(56) References Cited

U.S. PATENT DOCUMENTS

| | | |
|---|---|---|
| 2017/0332044 A1 | 11/2017 | Marlow et al. |
| 2018/0160055 A1 | 6/2018 | Taine et al. |
| 2019/0245812 A1 | 8/2019 | Rico |

(Continued)

OTHER PUBLICATIONS

International Preliminary Report on Patentability for Application No. PCT/US2022/041861, mailed on Mar. 7, 2024, 8 pages.

(Continued)

*Primary Examiner* — Yanna Wu
(74) *Attorney, Agent, or Firm* — DORITY & MANNING P.A.

(57) ABSTRACT

A computing system and method that can be used for safe and privacy preserving video representations of participants in a videoconference. In particular, the present disclosure provides a general pipeline for generating reconstructions of videoconference participants based on semantic statuses and/or activity statuses of the participants. The systems and methods of the present disclosure allow for videoconferences that convey necessary or meaningful information of participants through presentation of generalized representations of participants while filtering unnecessary or unwanted information from the representations by leveraging machine-learning models.

20 Claims, 9 Drawing Sheets

(56) References Cited

U.S. PATENT DOCUMENTS

2020/0314483 A1  10/2020 Rakshit et al.
2021/0195142 A1* 6/2021 Mireles ................ A61M 39/08

OTHER PUBLICATIONS

International Search Report and Written Opinion for Application No. PCT/US2022/041861, mailed Nov. 29, 2022, 14 pages.
Sun et al., "Authentic Emotion Detection in Real-Time Video", International Workshop on Computer Vision in Human-Computer Interaction, Springer, Berlin, Heidelberg, 2004, pp. 94-104.
International Preliminary Report on Patentability for Application No. PCT/US2022/041861, mailed Mar. 7, 2024, 8 pages.
International Search Report and Written Opinion for Application No. PCT/US2022/041861, mailed Nov. 9, 2022, 14 pages.

* cited by examiner

SAFE AND PRIVACY PRESERVING VIDEO REPRESENTATION

PRIORITY CLAIM

The present application is a continuation of U.S. application Ser. No. 17/459,964 having a filing date of Aug. 27, 2021, which is incorporated by reference herein. entirety.

FIELD

The present disclosure relates generally to videoconferencing. More particularly, the present disclosure relates to systems and methods for improving the videoconferencing experience by improving privacy and video appearance during a videoconference.

BACKGROUND

A videoconference can include technology for the reception and transmission of audio and/or video signals by users in different locations. In particular, video and/or audio communication can be transmitted simultaneously between people in real time. Videoconference can be achieved by leveraging a digital compression of audio and video streams in real time. A codec or coder/decoder can be used to perform compressions. The resulting digital stream can be subdivided into labeled packets which can then be transmitted through a digital network.

Historically there have been three types of videoconferencing. Dedicated systems can have all the required components packaged into a single piece of equipment. Frequently the dedicated system can leverage a console with a high-quality remote-controlled video camera, wherein the camera can be controlled at a distance. Desktop systems use add-ons such as hardware boards or software codec to standard laptops to transform them into videoconferencing devices. Certain platforms can use a web browser instead of dedicated native application software. Various degrees of security can be attached to the virtual "room".

While progress has been made in the field of videoconferencing, existing approaches are typically limited to users deciding between streaming their raw footage or not streaming any footage at all and do not consider alternative privacy and comfort conserving directions.

SUMMARY

Aspects and advantages of embodiments of the present disclosure will be set forth in part in the following description, or can be learned from the description, or can be learned through practice of the embodiments.

One example aspect of the present disclosure is directed to a computing system for videoconferencing. The computing system comprises one or more processors and one or more non-transitory computer-readable media that collectively store instructions that, when executed by the one or more processors, cause the computing system to perform operations. The operations comprise obtaining data associated with a video stream associated with a user. The operations comprise detecting a semantic status of the user within the video stream. The semantic status describes a meaning of an activity of the user relative to a videoconference. The operations comprise generating a generalized video representation of the user based on the semantic status of the user. The generalized video representation depicts a generalized representation of the semantic status of the user. The operations comprise transmitting data descriptive of the generalized video representation to one or more additional computing devices for presentation within the videoconference.

Other aspects of the present disclosure are directed to various methods, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
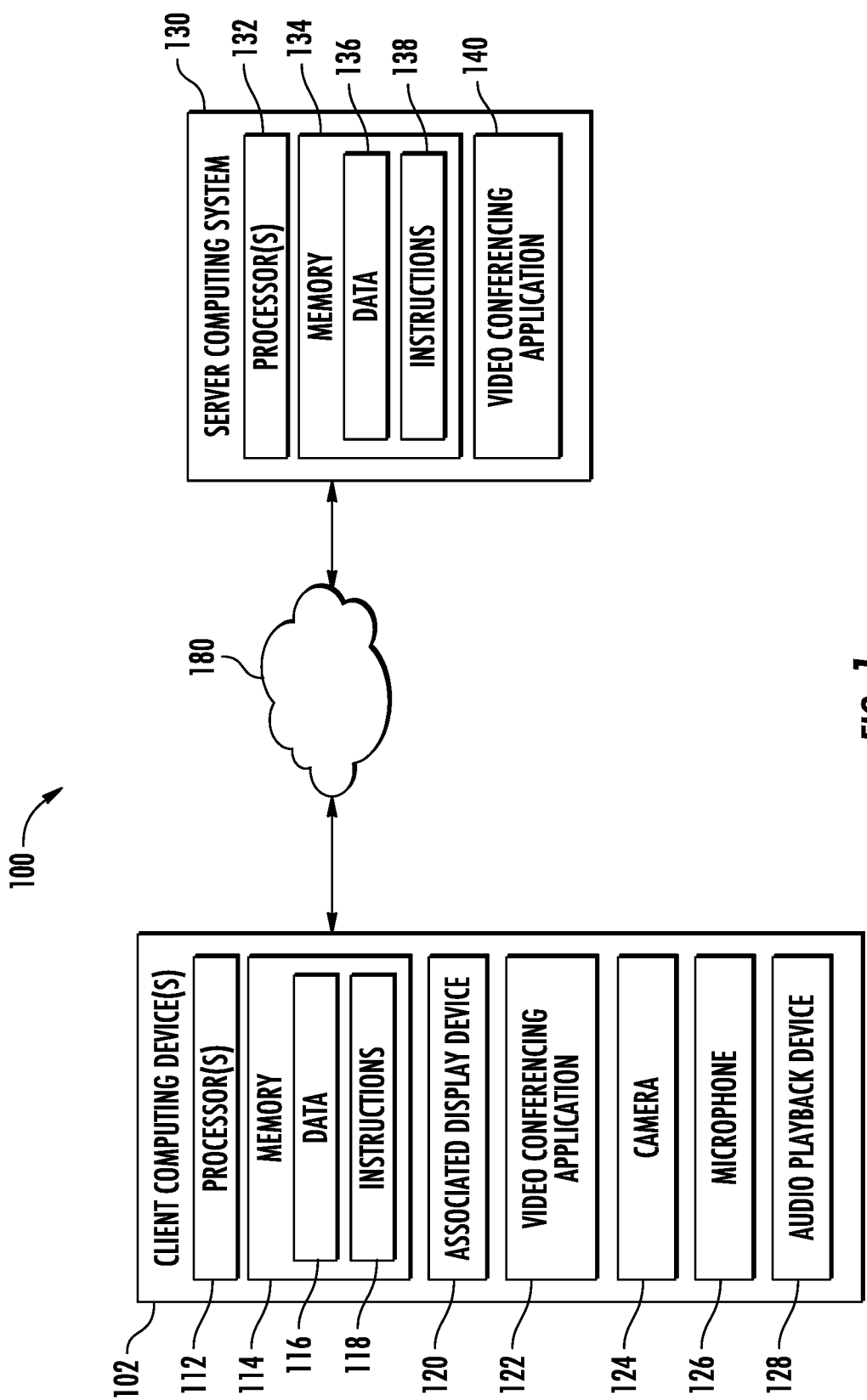
FIG. 1 depicts a block diagram of an example computing system according to example embodiments of the present disclosure.

Reference numerals that are repeated across plural figures are intended to identify the same features in various implementations.

DETAILED DESCRIPTION

Overview

Generally, the present disclosure is directed to videoconferencing, such as systems and methods for safe and privacy preserving video representations of participants in a videoconference. In particular, example aspects of the present disclosure involve computing systems and computer-implemented methods for generating reconstructions of videoconference participants based on semantic statuses and/or activity statuses of the participants. The systems and methods of the present disclosure allow for videoconferences that convey necessary or meaningful information of participants through presentation of generalized representations of participants while filtering unnecessary or unwanted information from the representations.

More particularly, the systems and methods of the present disclosure involve detecting semantic and activity statuses of participants in a videoconference. For example, the semantic statuses of the participants can include activity detected in a video stream determined to mean a participant is actively watching, looking down, attending elsewhere, or not present. The activity statuses of the participants can include indications a user is an active participant or an active listener in a videoconference. The systems and methods of the present disclosure can generate generalized representations of participants based on the detected semantic and/or activity statuses. For example, the generalized representations can include basic pose and attention representations of participants. As examples, a generalized representation of a participant may show the participant engaging in certain gestures or general body language. For example, the gestures or body language can include nodding in agreement, shaking the participant's head in disagreement, holding a thumb up, holding a thumb down, waving, etc.

Example aspects of the present disclosure (e.g., the generation and transmission of generalized representations) can be performed at different locations within a video conference system. In one example, the methods described herein can be performed on a user's device, such that a raw video of a user does not ever leave a user's device—only the generalized representation is transmitted. In other examples, the methods described herein can be performed at a centralized server of a video conference system. In one example, the methods described herein are performed at the centralized server, such that raw video of a user is not ever transmitted to other participants in the video conference—only the generalized representation is transmitted. In yet further implementations, some aspects (e.g., neural encoding of reference and/or input imagery into a latent representation) can be performed on a first user's device (e.g., the "sender's" device) while other aspects (e.g., neural decoding of the latent representation to an output image such as a generalized representation) can be performed on a second user device (e.g., on the "receiver's" device). This arrangement can provide benefits for both privacy and conservation of network bandwidth.

Example methods for video conferencing can include obtaining data (e.g., raw video data) associated with a video stream. In particular, the data associated with the video stream can be associated with a user or a group of users that are co-located with each other. For example, the computing system can obtain more than one video stream where each video stream is associated with a particular device that is associated with a different user or group of users.

In particular, in some instances, an audiovisual stream can correspond to a single user that is located by him or herself while, in other implementations, a single audiovisual stream can correspond to a group of users that are co-located with each other (e.g., located within the same room or space). In particular, in some implementations, if more than one user were in the same room, only audio from within a certain radius of an input device can be associated with the particular device associated with the input device and thus attributed to the user associated with the particular device within the videoconference. For instance, the audio stream can leverage voice recognition such that noises outside of an accepted range of frequencies are automatically filtered out to prevent background noise (e.g., from other users in the same room) from interfering with a videoconference. Likewise, in some implementations, only image portions which correspond to foreground imagery can be analyzed to understand and depict the semantic status of the user or group of users. In instances in which multiple persons are present within a single video stream, the video analysis and modification technologies described herein can be performed separately in parallel on the multiple persons (e.g., by first segmenting the video into multiple portions respectively associated with the multiple persons and then processing the video data using the techniques described herein.

Once video data depicting a user has been obtained, a semantic status of the user can be detected. In particular, the semantic status of the user can be detected within the video stream. The semantic status of the user can describe a meaning of an activity of the user, such as a meaning of an activity of the user relative to a videoconference. Stated differently, the semantic status can be a high-level representation of how another human participant in the videoconference would interpret or understand the visual information contained in the user's video stream, as it relates to the videoconference. Thus, the semantic status can represent a distillation of the meaningful information contained in a video stream with the visual details that are unrelated to the videoconference removed. For example, the computing system can detect the user giving a thumbs up or turning away, but not the unnecessary detail of the user's exact pose or posture.

A generalized video representation of the user can be generated. In particular, the generalized video representation of the user can be based on the semantic status of the user. In some implementations, the generalized video representation can be generated by modifying a generalized video input based on the semantic status of the user. Generalized video input can, for example, include reference imagery, models, or other avatars of the user (e.g., static image(s) of the user, a 3D model, a cartoon avatar, etc.). In some implementations, the generalized video input can be far more compact than pixel data. The generalized video input can be modified based on the semantic state information (e.g., a user's presence/not presence, a user paying attention/not paying attention, a user waving/not waving, a user's head positioning, a user giving a thumbs up/thumbs down, etc.) As an example, the generalized video representation can depict a generalized representation of the semantic status of the user. For instance, the generalized video representation of the user indicating a thumbs up can be a generalized representation of the user giving a thumbs up or giving an affirmative acknowledgement such as nodding while a user turning away can produce a generalized video representation of the user not paying attention such as a generalized representation of the user's face turning down or away.

In other implementations, the generalized video representation can be generated by directly modifying a raw video input based on the semantic status of the user, where the raw video depicts the user in their current state. For example, various techniques described elsewhere herein can apply machine learning and/or various image transformations to directly modify raw video of the user to generate the generalized video representation. In some implementations, whether the raw video is used or whether a generalized video input is used as an initial input to generation of the generalized video representation can be determined as a function of an activity status of the user.

In some implementations, both the generalized video input/or and the generalized video representation can be stored and processed on the user device. In particular, the user device can obtain video data from a camera associated with the user device. The user device can analyze the video to generate the generalized video representation. The data descriptive of the generalized video representation can be transmitted. In particular, the data descriptive of the generalized video representation can be transmitted to one or more additional computing devices. For example, the data descriptive of the generalized video representation can be transmitted directly to the one or more additional computing devices. As another example, the data descriptive of the generalized video representation can be transmitted to the one or more additional computing devices via a network. Even more particularly, the data descriptive of the generalized video representation can be transmitted to one or more additional computing devices for presentation within the videoconference. For example, the data descriptive of the user's generalized representation of an affirmative acknowledgement or of the user not paying attention can be transmitted to the computing devices of other users participating in the videoconference.

In some implementations, only the generalized video input is computed on the user device. In particular, the user device can read a video from a camera associated with the user device. The user device can analyze the video to generate the generalized video input. The user device can then transmit the generated generalized video input to one or more additional computing devices participating in the videoconference. For example, the data descriptive of the generalized video input can be transmitted directly to the one or more additional computing devices. As another example, the data descriptive of the generalized video input can be transmitted to the one or more additional computing devices via a network. The one or more additional computing devices can then use the received generalized video input to generate the generalized video representation. Specifically, the one or more additional computing devices can generate the generalized video representation locally. In particular, the one or more additional computing devices can transmit the generalized video representation on the videoconference. For example, the data descriptive of the user's generalized representation of an affirmative acknowledgement or of the user not paying attention can be transmitted to the computing devices of other users participating in the videoconference.

In some implementations, an activity status of the user can be determined. For instance, the computing system can identify that a user with a particular setting (e.g., a muted microphone) is in a particular activity status (e.g., listener status) while a user with a different setting (e.g., an unmuted microphone) is in a different activity status (e.g., participant status). In some implementations, the computing system can adjust a level of filtering of the generalized video representation. In particular, the computing system can adjust the level of filtering of the generalized video representation based in part on the activity status of the user. For example, a user with a participant activity status can have less filtering than a user with a listener activity status. For instance, for a user with a listener activity status, the computing system may only transmit a generalized representation of affirmative acknowledgement. However, for a user with an active participant status, the computing system may transmit the user's live actions (e.g., raw video of the user or video which has been modified to a lesser degree).

In some implementations, the activity status of the user can include an active and inactive component. For instance, a user that the computing system has determined to be a participant can additionally be classified as an active or inactive participant. As an example, a user determined to be a listener can be classified as an active listener if the computing system determines that the user is engaged in the videoconference (e.g., if the user is looking at the videoconference presentation). On the other hand, a user determined to be a listener can be classified as an inactive listener if the computing system determined that the user is not engaged in the videoconference (e.g., if the user is not looking at the videoconference presentation). Similarly, the computing system can determine an active and inactive classification for a user determined to be a participant.

In some implementations, the activity status of the user can be determined by one or a combination of factors. A factor determining the activity status of the user can include a mute status of the user. For example, the user can mute themselves or unmute themselves.

Another example factor considered when determining the activity status of the user can include a user-defined availability status. For example, the user can have an availability status. The availability status can include an icon indicating that the user is occupied (e.g., red), an icon indicating that the user is available (e.g., green), an icon indicating that the user is temporarily away (e.g., a clock), or an icon indicating that the user is offline or permanently away (e.g., empty).

Another example factor considered when determining the activity status of the user can include a user calendar status. For example, the user can have a user calendar status indicating that the user is free, unavailable, or scheduled to be in a meeting.

Another example factor considered when determining the activity status of the user can include a video-inferred status of the user. In particular, the video-inferred status of the user comprises an automatic determination of user activity. Even more particularly, the automatic determination of user activity can be based on a presence of detected activity in the video stream. The automatic determination of user activity can be based on an automatic determination of no user activity based on an absence of detected activity. In particular, the automatic determination of no user activity can be based on an absence of detected activity in the video stream. For example, the video-inferred status of the user can be determined in part due to where a user is looking (e.g., at the videoconference presentation vs. away from the videoconference presentation).

In some implementations, the video stream associated with a user can include a plurality of raw image data. Furthermore, the video stream associated with a user can include the generalized video representation of the user, wherein the video stream associated with a user including the generalized video representation of the user can exclude the plurality of raw image data. For example, the video stream associated with the user can include the raw footage of the user including anything the user could be indicating visually (e.g., hand gestures) as well as anything occurring in the background (e.g., animals or people walking through the background) as well as any extraneous actions the user may be engaging in (e.g., talking to another person outside of the videoconference). As another example, the video stream associated with the user can include the generalized video representation of the user (e.g., the generalized video representation of the user indicating an affirmative acknowledgement) while excluding the plurality of raw image data such as background activity (e.g., animals or people walking through the background) or any extraneous actions the user may be engaging in (e.g., talking to another person outside of the conference). Stated differently, in some instances the generalized representation of the user may not contain any of the raw pixel data from the original raw video data (e.g., the generalized representation may be wholly newly generated).

In some implementations, detecting the semantic status of the user can include using a machine-learned model. In particular, the machine-learned model could be a machine-learned image classification model. For example, the machine-learned image classification model can be used to detect the semantic status of the user (e.g., by leveraging features such as face tracking, face feature tracking, gesture recognition, etc.) by training on historical user data. As another example, the machine-learned image classification model can be used to detect the semantic status of the user by training on data generalized from a plurality of users. As one example, a machine-learned image classification model can be trained to classify an image of a user into one or more of a plurality of different classes which respectively correspond to a plurality of different semantic statuses. As one example, the classification model can be trained using a supervised learning approach on a training dataset that includes a plurality of training data pairs. Each pair of training data can include an image of a person or scene and a ground truth label that indicates a ground truth semantic status of the person or scene. For example, the machine-learned image classification model can be used to detect the semantic status of the user (e.g., where the user is looking, the user's head motion, the user's hand motion) by training on historical user data. As another example, the machine-learned image classification model can be used to detect the semantic status of the user by training on data generalized from a plurality of users.

Thus, in some implementations, semantic analysis of the user can use discriminative methodology. For instance, discriminative methodology can leverage classical machine learning techniques (e.g., Kernel function, ensemble method, multi-instance, etc.) In particular, semantic analysis of the user can use cognitive methodology. For instance, cognitive methodology can achieve four levels of computer vision functionalities: detection, localization, recognition, and understanding. The four levels of computer vision functionalities can be leveraged for semantic knowledge exploration and image understanding. Training a machine-learned model can include processing a training input with the model to generate a predicted output; evaluating a loss function that compares the predicted output with a ground truth training example output; and then modifying parameter values of the model based on the loss function (e.g., by backpropagating the loss function to update the model parameters). Models described herein with multiple portions can optionally be trained in an end-to-end manner in which all portions are jointly trained end-to-end from input to output.

As another example, the semantic status of a user based on an image can be determined by techniques such as semantic segmentation. In particular, each pixel in an image can be segmented within its region that has semantic value with a specific label (e.g., region-based, fully convolutional network-based, weakly supervised, etc.). The computing system can assign parts of the image semantic definitions. The machine-learned models can be trained on a library of images (e.g., provided by actors, employees, users, etc.) associated with particular semantic statuses such that input user images can be analyzed (e.g., parsed, segmented, etc.) and a semantic status can be identified.

In some implementations, generating the generalized video representation of the user can be based on the semantic status of the user. As one example, generating the generalized video representation of the user based on the semantic status of the user can comprise comparing the semantic status of the user to a reference database of personalized user images. The computing system can further generate or output the generated generalized video representation of the user based on the one or more personalized user images. For example, the user can be prompted by the computing system to input reference images where the reference images can correspond to various generalized responses that the computing system may output to the videoconference (e.g., the user can be prompted by the computing system to input a reference of the user giving a thumbs up). In particular, the machine-learning model can leverage a reference image (e.g., the user's reference image or a non-user reference image) to reconstruct the user's features in combination with on superimposed on the reference image to produce the generalized video representation.

More particularly, in some examples, a library of generalized video representations may be created by taking a single image of the user and generating a variety of responses. For example, the responses may be created by a model (e.g., a machine-learned model and/or an image warping model) that takes a reference image of the user and semantic characteristics (e.g., pose, face expression, gesture information, etc.) and generates a modified image that depicts the user within the reference image but having the semantic characteristics indicated in the second semantic image. In some implementations, the semantic characteristics can include a semantic image that depicts the semantic characteristics. As an example, the first reference image may come from the user, while the second semantic image may be created by actors or other sources. In one example, generative models can be used to perform the actions described above including, as one example, generative models performed as part of a generative adversarial network. Furthermore, new images or image elements (e.g., headphones, background, etc.) can be composited on top of the user image data to represent the generalized intent of the user (e.g., a user with headphones composited on top can represent that the user is not paying attention or is busy).

In one example, a machine-learned image generation model can include machine-learned encoder and decoder models. The machine-learned encoder and decoder models can be used to generate the generalized representation of the user. For example, the encoder can receive the raw image of the user and/or one or more reference images and encode the image(s) to a latent representation (which can also be referred to as a neural representation) that describes the semantic status and/or visual features depicted in the image(s). The decoder can expand the latent representation to a generalized representation of the user's semantic status. For example, the encoder and decoder models can be trained on a number of training data tuples, where each training data tuple includes a raw image of a user and/or one or more references images and a corresponding "correct" generalized representation of the user. In some implementations, some or all of the training data can be generated by purposefully degrading initially optimal imagery. For example, a "correct" generalized representation can be degraded via additional blur, addition of compression artifacts, changing the pose, changing the lighting, etc.

In another specific example, the machine-learned image generation model can receive as input a reference image and an input image. A feature extraction (or encoder) portion of the model can extract appearance features from the reference image (e.g., in the form of a neural representation). The model can also detect keypoints in each of the reference image and the input image. A motion field estimation portion of the model can generate a motion field by comparing the keypoints from each of the reference input and the input image. The motion field can be a dense motion map based on the two sets of landmarks. A generator (or decoder) portion of the model can receive the extracted features and the motion field as an input and can generate an output representation, wherein the output representation depicts the landmarks at the keypoints of the input image but having the appearance or features of the reference image. For example, the reference features can be warped based on the motion map and then a deep generative network can produce the output representation based on the warped features.

In some implementations, the generalized representation can have one or more of the following aspects: revised gaze, improved lighting, revised pose, higher resolution or super-resolution, and/or a modified background. In particular, the machine-learned image generation model can perform some or all of the listed aspects in a single pass (e.g., a single encoding-decoding cycle.

In some implementations, the encoder model and the decoder model can each be convolutional neural networks. In some implementations, the encoder model and the decoder model can be stored and run on the same device while in other implementations the encoder model and the decoder model can be stored and run on separate devices (e.g., a sender and a receiver device).

In some implementations, generating the generalized video representation based on the semantic status of the user can include determining one or more desired image elements (e.g., an indication of a user actively watching, an indication of a user looking down, an indication of a head of a user moving side-to-side, and indication of a head of a user moving up-and-down, an indication of a thumb of a user pointing upward, an indication of a thumb of a user pointing downward, an indication of a thumb of a user pointing downward, and indication of a hand of a user waving, an indication of a user being absent, etc.). In some implementations, the one or more desired image elements can further be determined based on the activity status of the user. Furthermore, generating the generalized video representation based on the semantic status of the user can include generating imagery that has the one or more desired image elements. For example, the desired image elements can be provided as input to a machine-learned image generation model. For example, the generalized video representation can include a number of cartoon avatars, a number of personalized emojis, a number of graphical depictions of gestures, or a number of pre-recorded images of the user that correspond to a plurality of semantic statuses.

In some implementations, the activity status of the user can be the active listener status. In particular, when the activity status of the user is the active listener status, the generalized video representation of the user can be generated based on the semantic status of the user. For example, generating the generalized video representation of the user can include mapping a reference image onto a captured image of a face of the user. The generating the generalized video representation can include compositing a reference image onto a captured image of a face of a user. In particular, a reference image can be composited onto a captured image of a face of a user by overlaying the images on each other. Even more particularly, the reference image can be cut to a desired shape (e.g., masked based, for example, on the results of semantic segmentation) to ensure the edges of the reference image can be seamlessly knit with the captured image. In some implementations, the reference image can consist of an image of the reference object in a plurality of angles such that the angle of the reference object is consistent with the angle of the user in the captured image. In some implementations, the reference image can consist of an image of the reference object in a plurality of resolutions such that the resolution of the reference image is consistent with the resolution of the captured image. In some implementations, the reference image can consist of an image of the reference object in a plurality of lighting arrangements such that the lighting of the reference image is consistent with the lighting in the captured image. For instance, the two overlayed images can be fused to generate a new single image consisting of elements in both the reference and captured image. In particular, shadows and highlights can be placed accordingly on the reference image and the captured image. As a specific example, when a semantic status of a user is determined (e.g., busy) a reference image associated with the determined semantic status of the user (e.g., headphones on) can be composited on the captured image to graphically indicate to others the semantic status (e.g., an image of headphones can be overlayed, fused, or otherwise composited on top of a captured image of a user such that the headphones cover portions of the users head such as ears while allowing other qualities to be seen such as the user's face as if the user was actually wearing headphones). The semantic status of the user can include replacing a captured image of the user with a graphical representation of the one or more desired image elements.

In some implementations, generating the generalized video representation based on the semantic status of the user can be determined based on the activity status of the user. In particular, the activity status of the user can determine a level of user permission (e.g., an activity status such as being a participant can grant a higher level of user permission than an activity status such as being a listener). Even more particularly, the level of user permission can be associated with the one or more desired image elements. In some implementations, one or more desired image elements can be determined based on the level of user permission. In particular, one or more desired image elements can be determined based on the level of user permission in combination with the activity status of the user.

In some implementations, determining the level of user permission associated with the one or more desired image elements can include assessing a plurality of different and pre-defined user image release permissions. In particular, the plurality of different and pre-defined user image release permissions can correspond to a sliding scale of permissiveness. For example, the plurality of different and pre-defined user image release permissions are not rigidly determined but can be adjusted based on the combination of user actions (e.g., mute button, video-inferred status, etc.).

Thus, the present disclosure provides a computing system and method that can be used to videoconference. In particular, the computing system can be used to provide systems and methods for safe and privacy preserving video representations of participants in a videoconference. More particularly, example aspects of the present disclosure involve computing systems and computer-implemented methods for generating reconstructions of videoconference participants based on semantic and activity statuses of the participants.

The systems and methods of the present disclosure allow for videoconferences that convey necessary information of participants through presentation of safe and available representations of participants while filtering unnecessary or unwanted information from the representations.

The systems and methods of the present disclosure provide a number of technical effects and benefits. As one example technical effect, the proposed techniques are able to provide users with an immersive and helpful experience during a virtual workday in a virtual workspace. In particular, providing members of a videoconference with generalized representations of the intentions of other members can greatly overcome user frustration as more and more members of videoconferences choose to completely turn their camera off in videoconferences due to privacy concerns. By providing members with generalized representations of the intentions of the other members, the participants can get an idea of listener's reactions and engagement in contrast to looking at black boxes. On the other hand, by only streaming generalized representations of their intentions, listeners can provide their reactions to participants without the concern that superfluous activity on their end might interfere with the videoconference.

Furthermore, the present disclosure opens the door to a virtual workplace as opposed to merely virtually working. In particular, the virtual workplace can replicate many desirable attributes of working in person while cutting down on the undesirable attributes. By leveraging the proposed techniques in a virtual workplace, users can more seamlessly communicate with others in a similar fashion as when working in person, thus reducing frustration, and optimizing collaboration. Even more particularly, by only transmitting selected images or videos, the proposed techniques allow users to be constantly virtually engaged in their workplace at a greatly reduced rate of transmission, thereby saving computational resources (e.g., processor usage, memory usage, network bandwidth, etc.).

With reference now to the Figures, example embodiments of the present disclosure will be discussed in further detail.

Example Devices and Systems

FIG. 1 depicts an example client-server environment 100 according to example embodiments of the present disclosure. The client-server environment 100 includes a client computing device 102 and a server computing system 130 that are connected by and communicate through a network 180. Although a single client computing device 102 is depicted, any number of client computing devices 102 can be included in the client-server environment 100 and connect to server computing system 130 over a network 180.

In some example embodiments, the client computing device 102 can be any suitable device, including, but not limited to, a smartphone, a tablet, a laptop, a desktop computer, a gaming console, or any other computer device that is configured such that it can allow a user to participate in a videoconference. The client computing device 102 can include one or more processor(s) 112, memory 114, an associated display device 120, a video conferencing application 122, a camera 124, a microphone 126, and an audio playback device 128 (e.g., speaker(s) such as stereo speakers).

The one or more processor(s) 112 can be any suitable processing device, such as a microprocessor, microcontroller, integrated circuit, or other suitable processing device. The memory 114 can include any suitable computing system or media, including, but not limited to, non-transitory computer-readable media, RAM, ROM, hard drives, flash drives, or other memory devices. The memory 114 can store information accessible by the one or more processor(s) 112, including instructions that can be executed by the one or more processor(s) 112. The instructions can be any set of instructions that when executed by the one or more processor(s) 112, cause the one or more processor(s) 112 to provide the desired functionality.

In particular, in some devices, memory 114 can store instructions for video conferencing between the client computing device 102 and the server computing system 130 (e.g., one or more video conferencing applications 122, etc.). The client computing device 102 can implement the instructions to execute aspects of the present disclosure, including directing communications with server computing system 130, providing a video conferencing application 122 and/or video stream to a user, scaling a received video stream to a different resolution display region, and/or generating and sending instructions to the server computing system requesting a new video stream for a display region.

It will be appreciated that the term "system" can refer to specialized hardware, computer logic that executes on a more general processor, or some combination thereof. Thus, a system can be implemented in hardware, application specific circuits, firmware, and/or software controlling a general-purpose processor. In one embodiment, the systems can be implemented as program code files stored on a storage device, loaded into memory, and executed by a processor or can be provided from computer program products, for example computer executable instructions, that are stored in a tangible computer-readable storage medium such as RAM, hard disk, or optical or magnetic media.

Memory 114 can also include data 116, such as video conferencing data (e.g., captured at the client computing device 102 or received from the server computing system 130), that can be retrieved, manipulated, created, or stored by the one or more processor(s) 112. In some example embodiments, such data can be accessed and displayed to one or more users of the client computing device 102 during a videoconference or transmitted to the server computing system 130.

The client computing device 102 can execute a video conferencing application 122. In one example, the video conferencing application 122 is a dedicated, purpose-built video conferencing application. In another example, the video conferencing application 122 is a browser application that executes computer-readable code locally (e.g., by processor(s) 112) to provide a videoconference as a web application.

The video conferencing application 122 can capture visual data from a camera 124 and/or a microphone 126 and transmit that data to the server computing system 130. The client computing device 102 can receive from the server computing system 130, audiovisual data (e.g., audio data and/or visual data) from one or more other participants of the videoconference (e.g., other client computing devices 102). The client computing device 102 can then display the received visual data to users of the client computing device 102 on associated display device 120 and/or cause playback of the received audio data to users of the client computing device 102 with the audio playback device 128. In some example embodiments, the camera 124 collects visual data from one or more users. The camera 124 can be any device capable of capturing visual data. The microphone 126 can be any device capable of capturing audio data. In one example, a webcam can serve as both a camera and a microphone.

In accordance with some example embodiments, the server computing system 130 can include one or more processor(s) 132, memory 134, and a video conferencing system 140. The memory 134 can store information accessible by the one or more processor(s) 132, including instructions 138 that can be executed by processor(s) and data 136.

The server computing system 130 can be in communication with one or more client computing device(s) 102 using a network communication device that is not pictured. The network 180 can be any type of communications network, such as a local area network (e.g., intranet), wide area network (e.g., Internet), or some combination thereof. In general, communication between the client computing device 102 and the server computing system 130 can be carried via network interface using any type of wired and/or wireless connection, using a variety of communication protocols (e.g., TCP/IP, HTTP, RTP, RTCP, etc.), encodings or formats (e.g., HTML, XML), and/or protection schemes (e.g., VPN, secure HTTP, SSL).

The server computing system 130 can include a video conferencing system 140. In some implementations, the video conferencing system 140 can be configured to facilitate operation of the video conferencing application 122 executed by one or more client computing devices 102. As an example, the video conferencing system 140 can receive audiovisual streams from a plurality of client computing devices 102 (e.g., via network 180) respectively associated with a plurality of videoconference attendees. The video conferencing system 140 can provide the audiovisual streams to each of the client computing devices 102.

The video conferencing application 122 and/or the video conferencing system 140 can operate independently or collaboratively to perform any of the techniques described herein.

Example Methods

Figure 2:
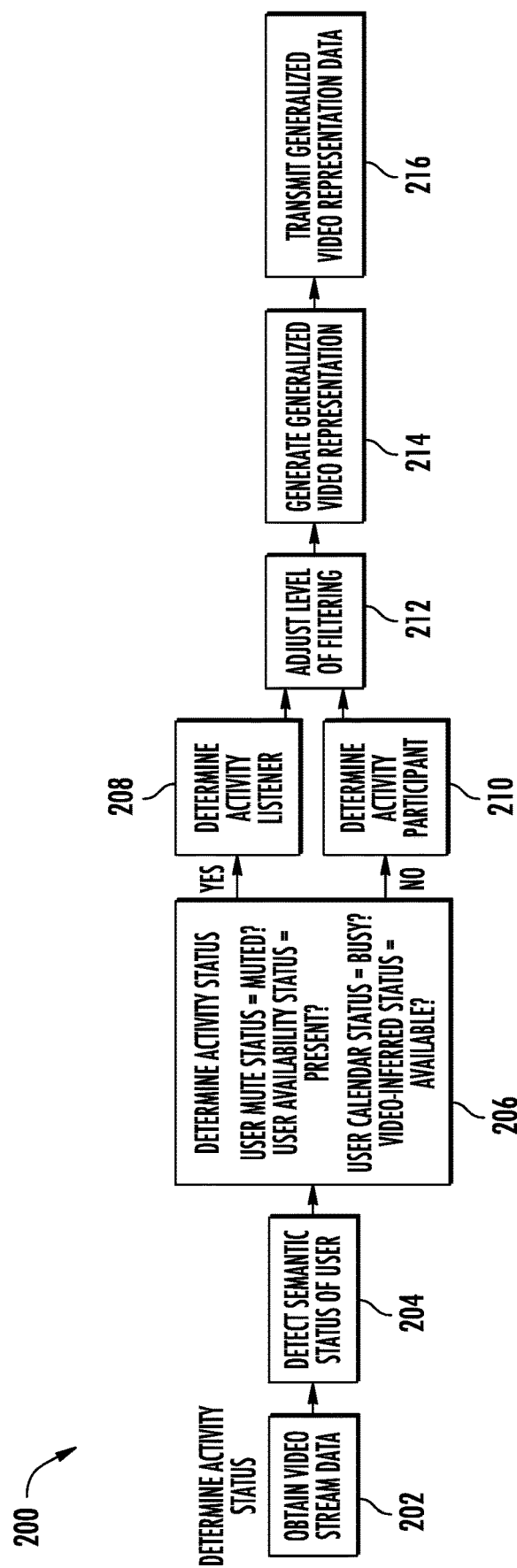
FIG. 2 depicts a diagram of example components of a videoconferencing system according to example embodiments of the present disclosure.

FIG. 2 depicts a flow chart diagram of an example method to perform according to example embodiments of the present disclosure. Although FIG. 2 depicts steps performed in a particular order for purposes of illustration and discussion, the methods of the present disclosure are not limited to the particularly illustrated order or arrangement. The various steps of the method 200 can be omitted, rearranged, combined, and/or adapted in various ways without deviating from the scope of the present disclosure.

At 202, a computing system can obtain video stream data. For instance, the video stream data can be the raw video stream data. For example, the raw video stream data can come directly from a device of the user (e.g., from a camera of the device).

At 204, the computing system can determine a semantic status of the user. For instance, the computing system can leverage the raw video stream data to determine the semantic status of the user. As an example, the semantic status of the user can indicate the intent of a user.

In some implementations, detecting the semantic status of the user can include using a machine-learned model. In particular, the machine-learned model could be a machine-learned image classification model. For example, the machine-learned image classification model can be used to detect the semantic status of the user (e.g., by leveraging features such as face tracking, face feature tracking, gesture recognition, etc.) by training on historical user data. As another example, the machine-learned image classification model can be used to detect the semantic status of the user by training on data generalized from a plurality of users. As one example, a machine-learned image classification model can be trained to classify an image of a user into one or more of a plurality of different classes which respectively correspond to a plurality of different semantic statuses. As one example, the classification model can be trained using a supervised learning approach on a training dataset that includes a plurality of training data pairs. Each pair of training data can include an image of a person or scene and a ground truth label that indicates a ground truth semantic status of the person or scene. For example, the machine-learned image classification model can be used to detect the semantic status of the user (e.g., where the user is looking, the user's head motion, the user's hand motion) by training on historical user data. As another example, the machine-learned image classification model can be used to detect the semantic status of the user by training on data generalized from a plurality of users.

Thus, in some implementations, semantic analysis of the user can use discriminative methodology. For instance, discriminative methodology can leverage classical machine learning techniques (e.g., Kernel function, ensemble method, multi-instance, etc.) In particular, semantic analysis of the user can use cognitive methodology. For instance, cognitive methodology can achieve four levels of computer vision functionalities: detection, localization, recognition, and understanding. The four levels of computer vision functionalities can be leveraged for semantic knowledge exploration and image understanding. Training a machine-learned model can include processing a training input with the model to generate a predicted output; evaluating a loss function that compares the predicted output with a ground truth training example output; and then modifying parameter values of the model based on the loss function (e.g., by backpropagating the loss function to update the model parameters).

As another example, the semantic status of a user based on an image can be determined by techniques such as semantic segmentation. In particular, each pixel in an image can be segmented within its region that has semantic value with a specific label (e.g., region-based, fully convolutional network-based, weakly supervised, etc.). The computing system can assign parts of the image semantic definitions. The machine-learned models can be trained on a library of images (e.g., provided by actors, employees, users, etc.) associated with particular semantic statuses such that input user images can be analyzed (e.g., parsed, segmented, etc.) and a semantic status can be identified.

At 206, the computing system can determine a user activity status. For instance, the activity status can be based on the detected semantic status of the user or may be separate from the detected semantic status of the user. As an example, the activity status can be based on a user mute status. The activity status can be determined at least in part on if the user is muted or not muted. As another example, the activity status can be based on a user availability status. The activity status can be determined at least in part on if the user is present or not present (e.g., based on the user video stream data). As yet another example, the activity status can be based on a user calendar status (e.g., a user can input scheduled meetings or appointments in a calendar by date and time). The activity status can be determined at least in part on if the user's calendar indicates whether the user is engaged in a meeting or appointment or not. As yet another example, the activity status can be based on a video-inferred status. The activity status can be determined at least in part on the inferred user status based on the video stream data (e.g., a user can be determined to be unavailable if the user has on headphones).

At 208, the computing system can determine that the user is an active listener. For instance, the computing system can determine that the user is an active listener if the computing system determines one or more user activity statuses as indicating an active listener. As an example, the computing system can determine that the user is an active listener at least in part of if the computing system determines that the user is muted. As another example, the computing system can determine that the user is an active listener at least in part of if the computing system determines that the user is present.

Additionally or alternatively to 208, at 210, the computing system can determine that the user is an active participant. For instance, the computing system can determine that the user is an active participant if the computing system determines one or more user activity status as indicating an active participant. As an example, the computing system can determine that the user is an active participant at least in part of if the computing system determines that the user is unmuted. As another example, the computing system can determine that the user is an active participant at least in part of if the user is present.

At 212, the computing system can adjust a level of filtering based on the user activity status. For instance, the computing system can adjust a level of filtering based at least in part on if the computing system has determined if the user is an active listener (e.g., the computing system can increase the level of filtering if the computing system has determined that the user is an active listener). For instance, the computing system can adjust a level of filtering based at least in part on if the computing system has determined if the user is an active participant (e.g., the computing system can decrease the level of filtering if the computing system has determined that the user is an active participant).

At 214, the computing system can generate a generalized video representation of the user. For instance, the computing system can generate a generalized video representation of the user based on the intent of the user at least in part based on the semantic status of the user or the activity status of the user.

As one example, generating the generalized video representation of the user based on the semantic status of the user can comprise comparing the semantic status of the user to a reference database of personalized user images. The computing system can further generate or output the generated generalized video representation of the user based on the one or more personalized user images. For example, the user can be prompted by the computing system to input reference images where the reference images can correspond to various generalized responses that the computing system may output to the videoconference (e.g., the user can be prompted by the computing system to input a reference of the user giving a thumbs up). In particular, the machine-learning model can leverage a reference image (e.g., the user's reference image or a non-user reference image) to reconstruct the user's features in combination with on superimposed on the reference image to produce the generalized video representation.

More particularly, in some examples, a library of generalized video representations may be created by taking a single image of the user and generating a variety of responses. For example, the responses may be created by a model (e.g., a machine-learned model and/or an image warping model) that takes a reference image of the user and semantic characteristics (e.g., pose, face expression, gesture information, etc.) and generates a modified image that depicts the user within the reference image but having the semantic characteristics indicated in the second semantic image. In some implementations, the semantic characteristics can include a semantic image that depicts the semantic characteristics. As an example, the first reference image may come from the user, while the second semantic image may be created by actors or other sources. In one example, generative models can be used to perform the actions described above including, as one example, generative models performed as part of a generative adversarial network. Furthermore, new images or image elements (e.g., headphones, background, etc.) can be composited on top of the user image data to represent the generalized intent of the user (e.g., a user with headphones composited on top can represent that the user is not paying attention or is busy).

In one example, a machine-learned image generation model can include machine-learned encoder and decoder models. The machine-learned encoder and decoder models can be used to generate the generalized representation of the user. For example, the encoder can receive the raw image of the user and/or one or more reference images and encode the image(s) to a latent representation (which can also be referred to as a neural representation) that describes the semantic status and/or visual features depicted in the image (s). The decoder can expand the latent representation to a generalized representation of the user's semantic status. For example, the encoder and decoder models can be trained on a number of training data tuples, where each training data tuple includes a raw image of a user and/or one or more references images and a corresponding "correct" generalized representation of the user. In some implementations, some or all of the training data can be generated by purposefully degrading initially optimal imagery. For example, a "correct" generalized representation can be degraded via additional blur, addition of compression artifacts, changing the pose, changing the lighting, etc.

In another specific example, the machine-learned image generation model can receive as input a reference image and an input image. A feature extraction (or encoder) portion of the model can extract appearance features from the reference image (e.g., in the form of a neural representation). The model can also detect keypoints in each of the reference image and the input image. A motion field estimation portion of the model can generate a motion field by comparing the keypoints from each of the reference input and the input image. The motion field can be a dense motion map based on the two sets of landmarks. A generator (or decoder) portion of the model can receive the extracted features and the motion field as an input and can generate an output representation, wherein the output representation depicts the landmarks at the keypoints of the input image but having the appearance or features of the reference image. For example, the reference features can be warped based on the motion map and then a deep generative network can produce the output representation based on the warped features.

In some implementations, the generalized representation can have one or more of the following aspects: revised gaze, improved lighting, revised pose, higher resolution or super-resolution, and/or a modified background. In particular, the machine-learned image generation model can perform some or all of the listed aspects in a single pass (e.g., a single encoding-decoding cycle.

In some implementations, the encoder model and the decoder model can each be convolutional neural networks. In some implementations, the encoder model and the decoder model can be stored and run on the same device while in other implementations the encoder model and the decoder model can be stored and run on separate devices (e.g., a sender and a receiver device).

In some implementations, generating the generalized video representation based on the semantic status of the user can include determining one or more desired image elements (e.g., an indication of a user actively watching, an indication of a user looking down, an indication of a head of a user moving side-to-side, and indication of a head of a user moving up-and-down, an indication of a thumb of a user pointing upward, an indication of a thumb of a user pointing downward, an indication of a thumb of a user pointing downward, and indication of a hand of a user waving, an indication of a user being absent, etc.). In some implementations, the one or more desired image elements can further be determined based on the activity status of the user. Furthermore, generating the generalized video representation based on the semantic status of the user can include generating imagery that has the one or more desired image elements. For example, the desired image elements can be provided as input to a machine-learned image generation model. For example, the generalized video representation can include a number of cartoon avatars, a number of personalized emojis, a number of graphical depictions of gestures, or a number of pre-recorded images of the user that correspond to a plurality of semantic statuses.

In some implementations, the activity status of the user can be the active listener status. In particular, when the activity status of the user is the active listener status, the generalized video representation of the user can be generated based on the semantic status of the user. For example, generating the generalized video representation of the user can include mapping a reference image onto a captured image of a face of the user. The generating the generalized video representation can include compositing a reference image onto a captured image of a face of a user. In particular, a reference image can be composited onto a captured image of a face of a user by overlaying the images on each other. Even more particularly, the reference image can be cut to a desired shape (e.g., masked based, for example, on the results of semantic segmentation) to ensure the edges of the reference image can be seamlessly knit with the captured image. In some implementations, the reference image can consist of an image of the reference object in a plurality of angles such that the angle of the reference object is consistent with the angle of the user in the captured image. In some implementations, the reference image can consist of an image of the reference object in a plurality of resolutions such that the resolution of the reference image is consistent with the resolution of the captured image. In some implementations, the reference image can consist of an image of the reference object in a plurality of lighting arrangements such that the lighting of the reference image is consistent with the lighting in the captured image. For instance, the two overlayed images can be fused to generate a new single image consisting of elements in both the reference and captured image. In particular, shadows and highlights can be placed accordingly on the reference image and the captured image. As a specific example, when a semantic status of a user is determined (e.g., busy) a reference image associated with the determined semantic status of the user (e.g., headphones on) can be composited on the captured image to graphically indicate to others the semantic status (e.g., an image of headphones can be overlayed, fused, or otherwise composited on top of a captured image of a user such that the headphones cover portions of the users head such as ears while allowing other qualities to be seen such as the user's face as if the user was actually wearing headphones). The semantic status of the user can include replacing a captured image of the user with a graphical representation of the one or more desired image elements.

At 216, the computing system can transmit the generalized video representation data. For instance, the computing system can transmit the generalized video representation data to one or more devices that one or more users are using to participate in a videoconference.

Figure 3:
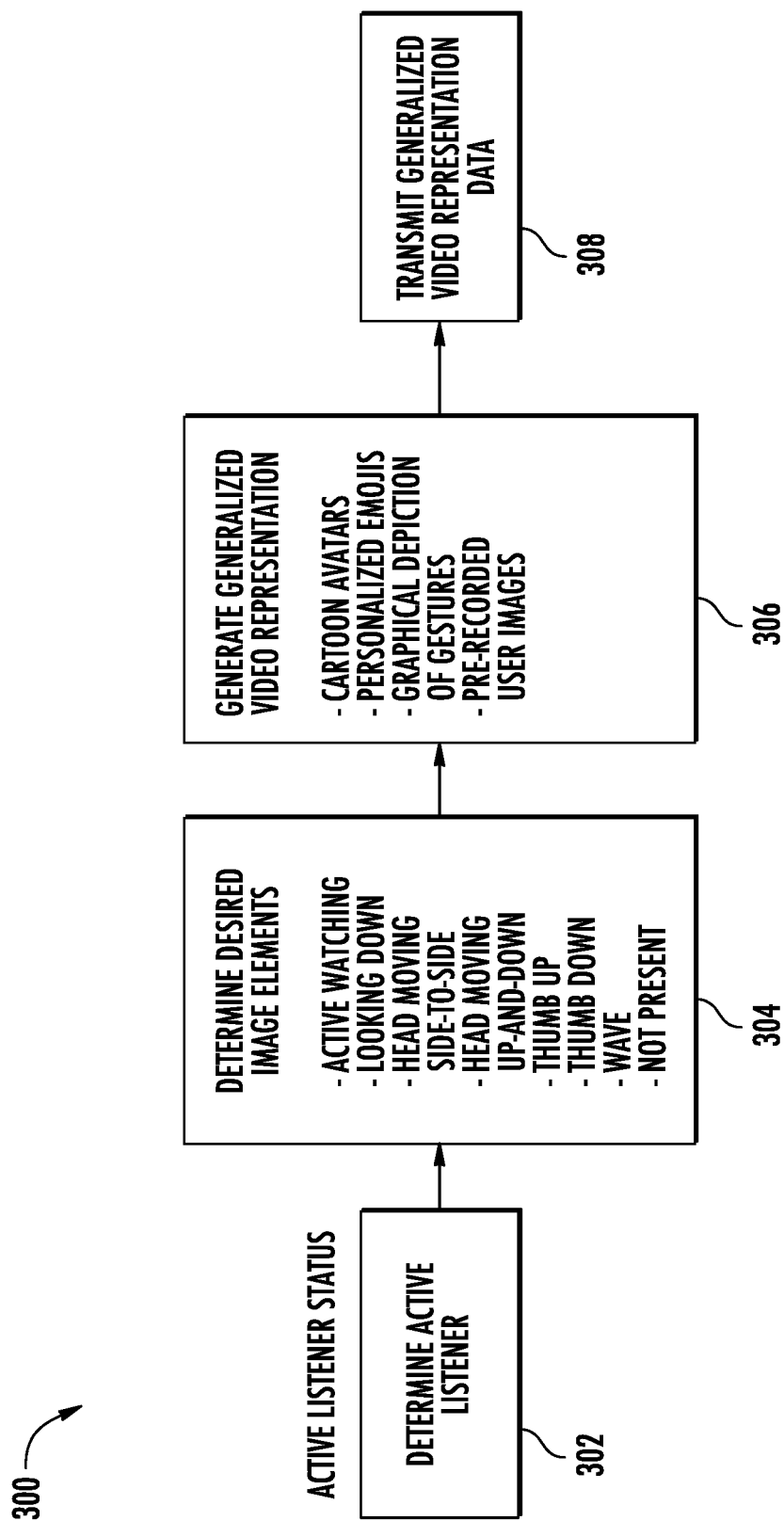
FIG. 3 depicts another diagram of example components of a videoconferencing system according to example embodiments of the present disclosure.

FIG. 3 depicts a flow chart diagram of an example method to perform according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, the computing system can determine that the user is an active participant. For instance, the computing system can determine that the user is an active participant if the computing system determines one or more user activity status as indicating an active participant. As an example, the computing system can determine that the user is an active participant at least in part of if the computing system determines that the user is unmuted. As another example, the computing system can determine that the user is an active participant at least in part of if the user is present.

At 304, the computing system can determine desired image elements. For instance, the computing system can determine the desired image elements based on a raw user video. In particular, the computing system can determine desired image elements such as active watching, looking down, head moving side-to-side, head moving up-and-down, thumb up, thumb down, wave, presence.

At 306, the computing system can generate a generalized video representation of the user. In particular, the computing system can generate a generalized video representation of the user's intentions. For example, the computing system can generate a generalized video representation of the user's intentions by generating one or more of a cartoon avatar, personalized emoji, graphical depiction of gestures, or pre-recorded user images.

At 308, the computing system can transmit the generalized video representation data. For instance, the computing system can transmit the generalized video representation data to one or more devices that one or more users are using to participate in a videoconference.

Example Model Arrangements

Figure 4:
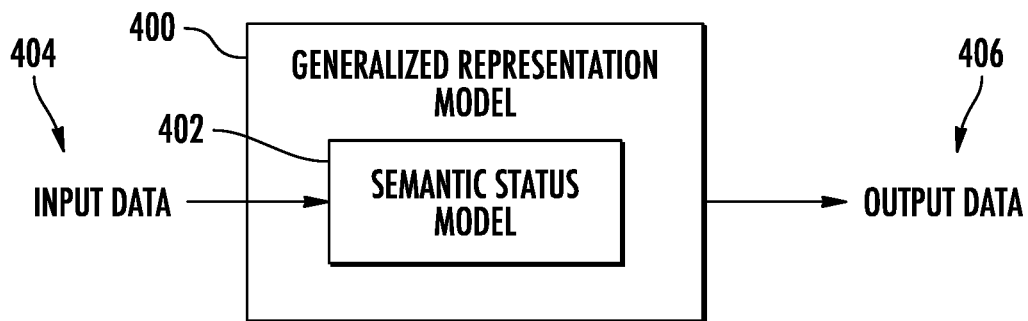
FIG. 4 depicts a block diagram of an example generalized representation model according to example embodiments of the present disclosure.

FIG. 4 depicts a block diagram of an example generalized representation model 400 according to example embodiments of the present disclosure. In some implementations, the generalized representation model 400 is trained to receive a set of input data 404 descriptive of raw user data and, as a result of receipt of the input data 404, provide output data 406 that includes a generalized representation of the intention presented in the raw user data. Thus, in some implementations, the generalized representation model 400 can include a semantic status model 402 that is operable to generate a prediction of what semantic status the user is engaging in.

In particular, semantic status model 402 can leverage the input data 404 to determine a current semantic status of a user based on input data 404. For instance, the semantic status model 402 can predict the semantic intention of a user based on the input data 404.

In some implementations, the semantic status model 402 can be a machine-learned image classification model. For example, the machine-learned image classification model can be used to detect the semantic status of the user (e.g., by leveraging features such as face tracking, face feature tracking, gesture recognition, etc.) by training on historical user data. As another example, the machine-learned image classification model can be used to detect the semantic status of the user by training on data generalized from a plurality of users. As one example, a machine-learned image classification model can be trained to classify an image of a user into one or more of a plurality of different classes which respectively correspond to a plurality of different semantic statuses. As one example, the classification model can be trained using a supervised learning approach on a training dataset that includes a plurality of training data pairs. Each pair of training data can include an image of a person or scene and a ground truth label that indicates a ground truth semantic status of the person or scene. For example, the machine-learned image classification model can be used to detect the semantic status of the user (e.g., where the user is looking, the user's head motion, the user's hand motion) by training on historical user data. As another example, the machine-learned image classification model can be used to detect the semantic status of the user by training on data generalized from a plurality of users.

The generalized representation model 400 can leverage the output of the semantic status model 402 to generate a generalized representation of the user (e.g., a representation of the user) engaging in the semantic intention predicted by the semantic status model 402. Even more particularly, the generalized representation model 400 can leverage the input data 404 in combination with the output of the semantic status model 402 to generate the output data 406 which could include the representation of a user engaging in an activity indicating an intention (e.g., paying attention, not paying attention, affirmation, negation, etc.) in a generalized manner.

In some implementations, the generalized representation model 400 can include a machine-learned image generation model can include machine-learned encoder and decoder models. The machine-learned encoder and decoder models can be used to generate the generalized representation of the user. For example, the encoder can receive the raw image of the user and/or one or more reference images and encode the image(s) to a latent representation (which can also be referred to as a neural representation) that describes the semantic status and/or visual features depicted in the image (s). The decoder can expand the latent representation to a generalized representation of the user's semantic status. For example, the encoder and decoder models can be trained on a number of training data tuples, where each training data tuple includes a raw image of a user and/or one or more references images and a corresponding "correct" generalized representation of the user. In some implementations, some or all of the training data can be generated by purposefully degrading initially optimal imagery. For example, a "correct" generalized representation can be degraded via additional blur, addition of compression artifacts, changing the pose, changing the lighting, etc.

In another specific example, the machine-learned image generation model can receive as input a reference image and an input image. A feature extraction (or encoder) portion of the model can extract appearance features from the reference image (e.g., in the form of a neural representation). The model can also detect keypoints in each of the reference image and the input image. A motion field estimation portion of the model can generate a motion field by comparing the keypoints from each of the reference input and the input image. The motion field can be a dense motion map based on the two sets of landmarks. A generator (or decoder) portion of the model can receive the extracted features and the motion field as an input and can generate an output representation, wherein the output representation depicts the landmarks at the keypoints of the input image but having the appearance or features of the reference image. For example, the reference features can be warped based on the motion map and then a deep generative network can produce the output representation based on the warped features.

In some implementations, the generalized representation can have one or more of the following aspects: revised gaze, improved lighting, revised pose, higher resolution or super-resolution, and/or a modified background. In particular, the machine-learned image generation model can perform some or all of the listed aspects in a single pass (e.g., a single encoding-decoding cycle).

In some implementations, the encoder model and the decoder model can each be convolutional neural networks. In some implementations, the encoder model and the decoder model can be stored and run on the same device while in other implementations the encoder model and the decoder model can be stored and run on separate devices (e.g., a sender and a receiver device). In some implementations, the encoder model is the same as the semantic status model 402 while in other implementations they are different models. Thus, various combinations of model(s) can be used to determine the semantic status of a user and to generate a generalized video representation of the user that depicts the semantic status.

Figure 5:
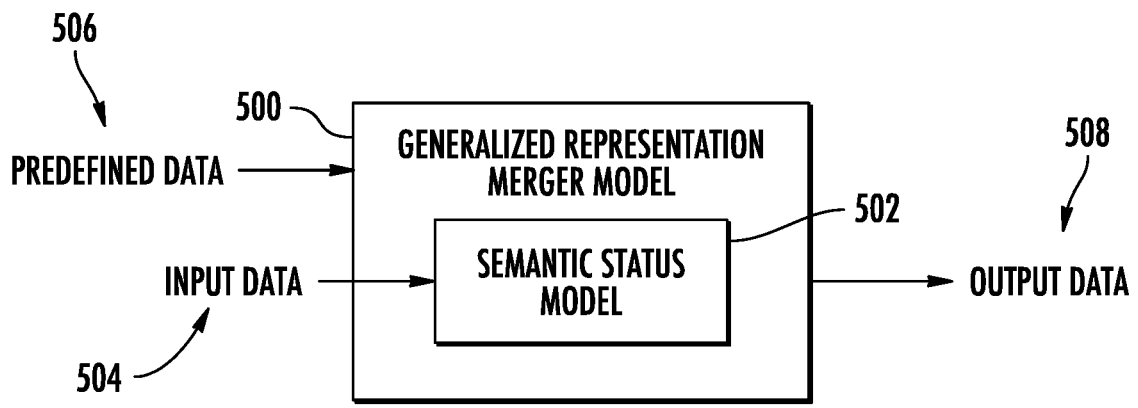
FIG. 5 depicts another block diagram of example generalized representation model according to example embodiments of the present disclosure

FIG. 5 depicts a block diagram of an example generalized representation model 500 according to example embodiments of the present disclosure. The generalized representation model 500 is similar to generalized representation model 400 of FIG. 4 except that generalized representation model 500 further includes additional input data wherein predefined data 506 can be input directly to the generalized representation model 500. In particular, the generalized representation model 500 can leverage the output of the semantic status model 502 in combination with the predefined data 506 as opposed to the raw input data 504. Thus, the generalized representation model 500 can generate a representation of the user based on predefined data 506 (e.g., previously logged images of the user engaging in representative actions, previously logged images of a non-user engaging in representative actions, etc.). For instance, in one application the generalized representation model 500 can output a previously captured image of the user engaging in a representative action depending on the output of the semantic status model 502 based on the raw input data 504 (e.g., the generalized representation model 500 can label predefined data 506 according to the output of semantic status model 502). As another example, the generalized representation model 500 can engage in mapping a representation of the user onto an image of a non-user engaging in the particular semantic action indicated by the semantic status model 502 (e.g., the generalized representation model can leverage matching key points, warping of one image, etc.).

Example Applications

Figure 6:
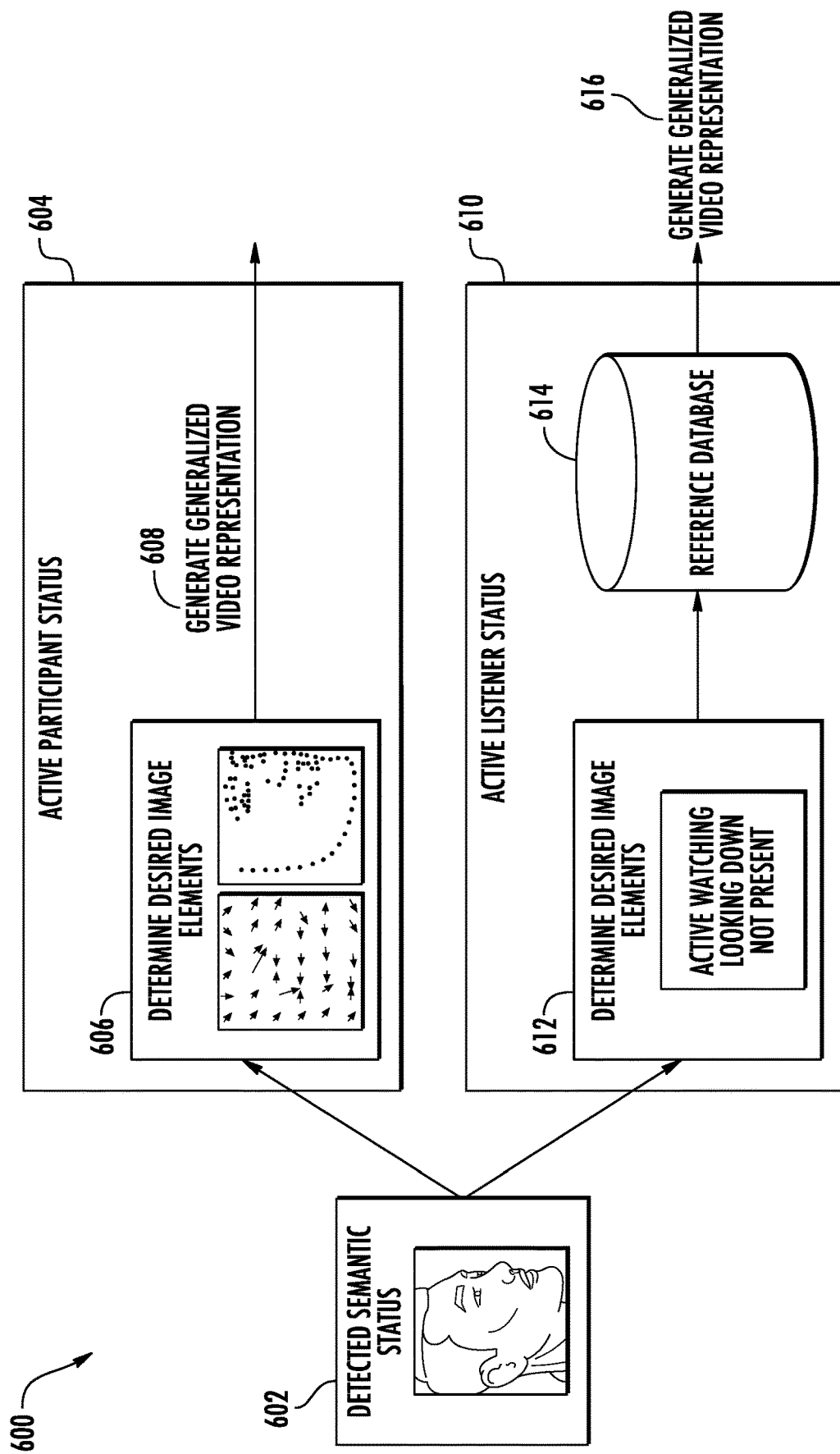
FIG. 6 depicts a representation of example components of a videoconferencing system incorporating machine-learning components according to example embodiments of the present disclosure.

FIG. 6 illustrates an exemplary implementation of example method described in FIG. 2. 600 shows an exemplary application of leveraging a detected semantic status 602 of a user to determine a user status as an active participant or an active listener. In one implementation when the computing system determines a user status as an active participant 604, the computing system can further determine desired image elements 606 by leveraging various secondary computing systems (e.g., machine learning, face tracking, face feature recognition, gesture recognition, etc.). Once the computing system determines desired image elements 606 by leveraging various computing systems, the computing system can generate generalized video representation 608. For instance, the computing system can leverage the data determined by the various computing systems used to determine desired image elements 606 to generate a generalized video representation 608.

In one implementation when the computing system determines a user status as an active listener 610, the computing system can further determine desired image elements 612 (e.g., active watching, looking down, presence, etc.). Based on the desired image elements 612, the computing system can determine a corresponding representation from a reference database 614. Based on the corresponding representation from a reference database 614 the computing system can generate a generalized video representation 616. As an example, the computing system can leverage secondary computing systems to composite reference images on top of raw image data (e.g., background, headphones, etc.) As another example, the computing system can leverage secondary computing systems to reconstruct user facial features on a reference image.

Figure 7:
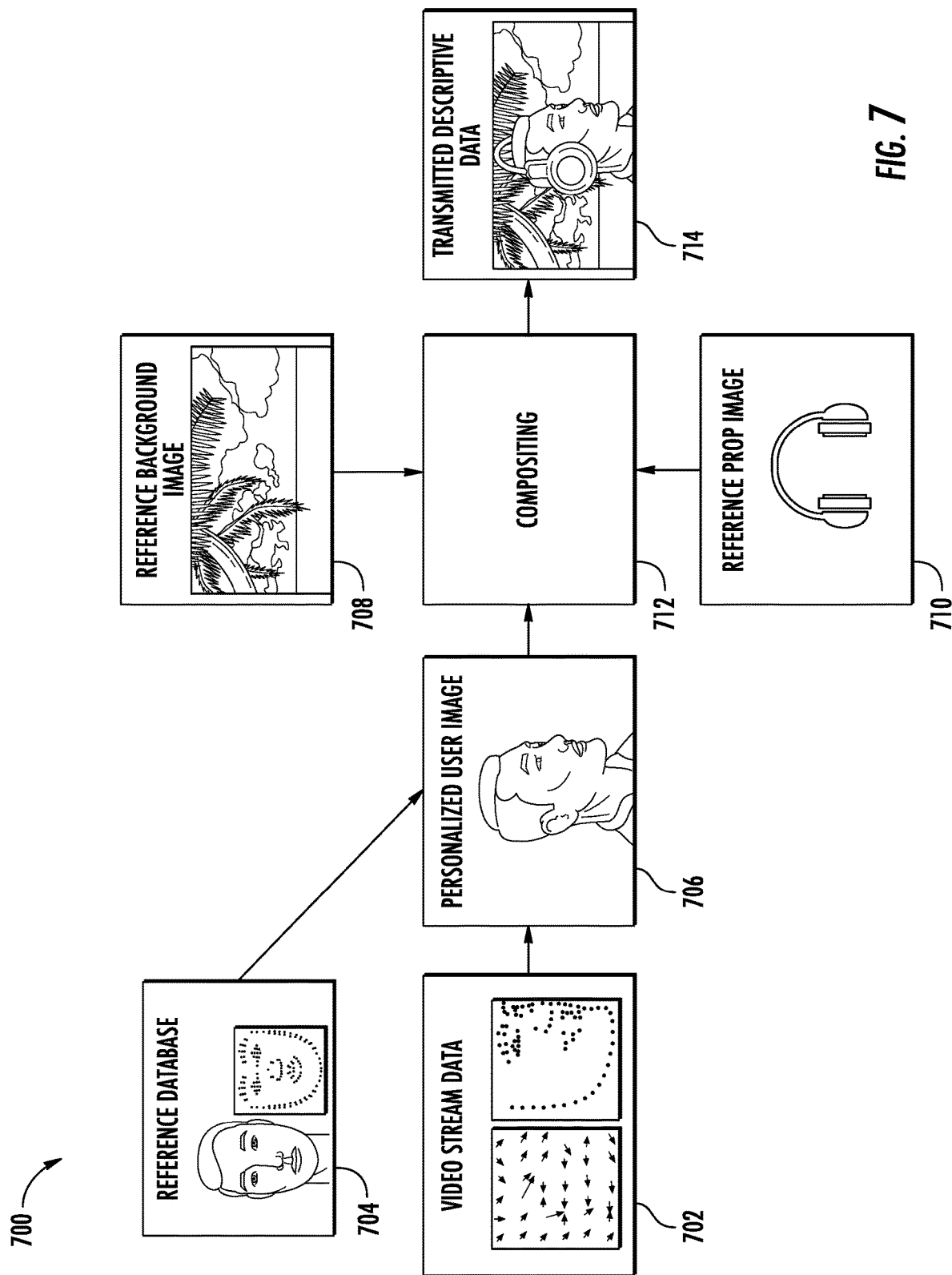
FIG. 7 depicts an alternate representation of example components of a videoconferencing system according to example embodiments of the present disclosure.

FIG. 7 illustrates an application of the computing system compositing 712 reference images on top of raw image data 702. In particular, the raw image data 702 (e.g., video stream data) can be used in combination with a reference image 704 obtained from a reference database 700 to generate a personalized user image 706. The personalized user image 706 can be composited 712 in combination with one or more of a reference background image 708 and a reference prop image 710 to generate a generalized image that can be transmitted 714 to other user devices engaging in a videoconference. For example, the personalized user image 706 can be composited 712 with a landscape image (e.g., user selected) and an image of headphones (e.g., when the user has indicated that they are busy) to produce a generalized image of the user.

In particular, still with reference to FIG. 7, the video stream data 702 can include keypoints extracted from an input image (e.g., a current image of the user in the videoconference). The video stream data 702 can also include a motion field that demonstrates differences between the keypoints in the input image and keypoints from the reference imagery 704. The motion field can be a dense motion map based on the two sets of landmarks. A generator (or decoder) portion of an image generation model can receive the reference features 704 and the video stream data 702 as an input and can generate a personalized output representation 706, wherein the personalized output representation 706 depicts the features of the reference image 704 at the keypoints of the input image as given in the video stream data 702. For example, the reference features can be warped based on the motion map and then a deep generative network can produce the output representation 706 based on the warped features.

Figure 8:
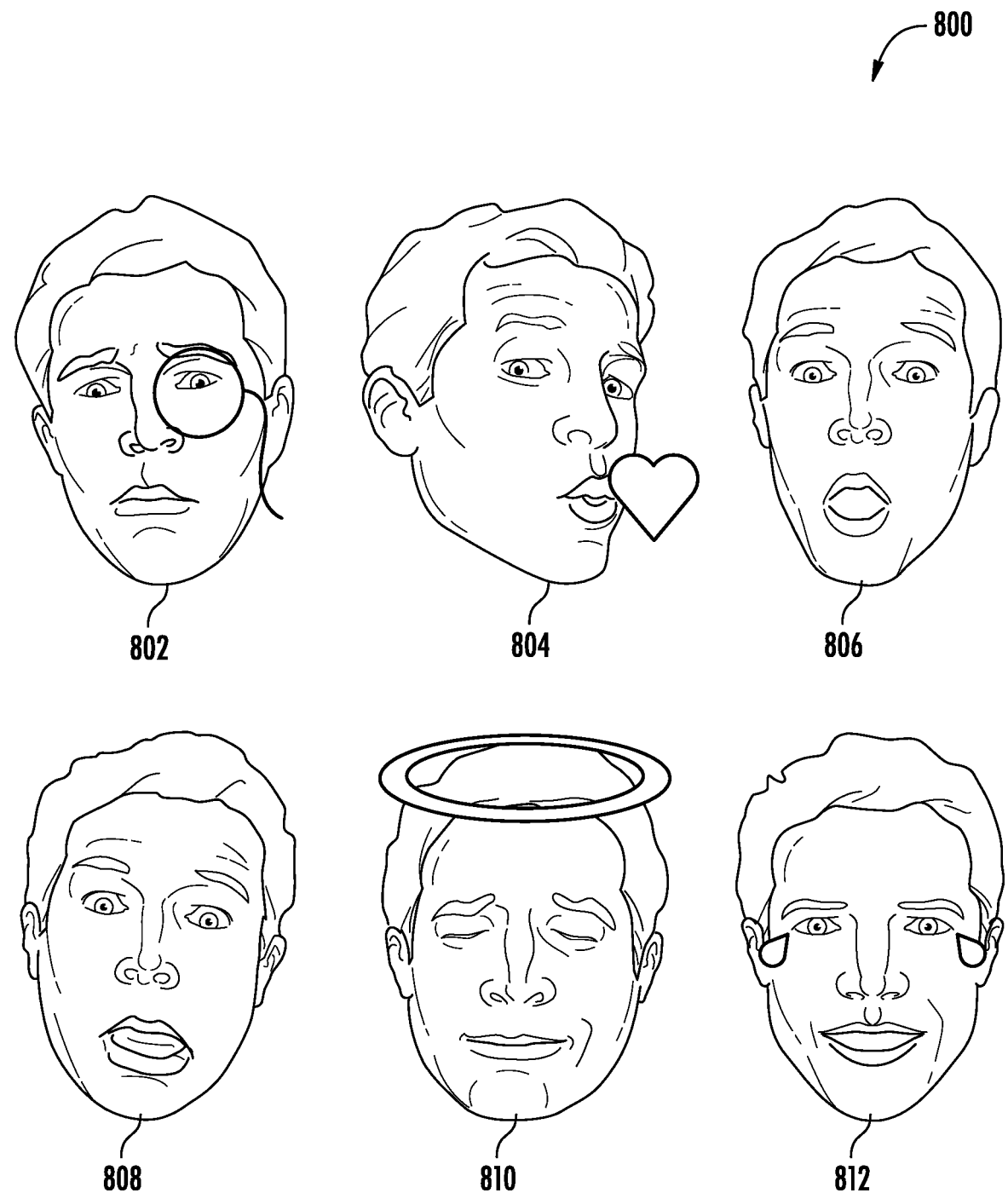
FIG. 8 depicts example emojis according to example embodiments of the present disclosure.

FIG. 8 illustrates an application of the computing system to generate personalized user emojis 800. For instance, the computing system can leverage a composite of a reference image and a user image to generate the personalized user emojis. As another example, the computing system can request a user input user specific images associated with specified emoji emotions. In particular, the computing system can composite reference prop images on top of user input reference images. For example, the computing system can generate user emojis such as an emoji indicating a user being curious 802, loving 804, surprised 806, silly 808, angelic 810 and laughing 812.

Figure 9:
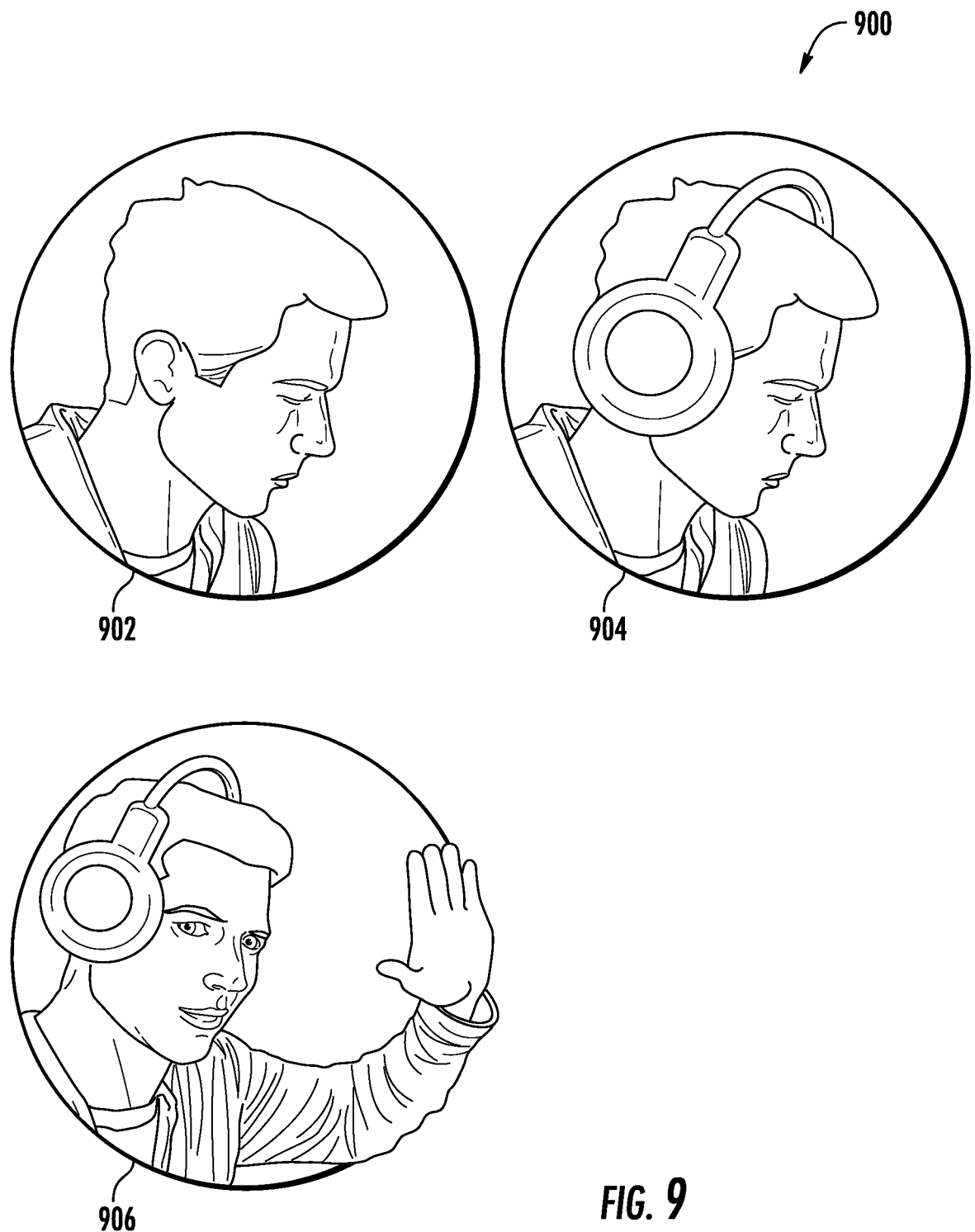
FIG. 9 depicts example graphical representations of gestures according to example embodiments of the present disclosure.

FIG. 9 illustrates an application of the computing system generating a user avatar 900 indicating the status of a user. The computing system can use a first image of a user 902 which can be obtained from raw image data or a reference database of pre-input user images. The computing system can composite a prop image such as headphones on a user to composite an image indicating a user is busy 904. The user avatar indicating that a user is busy 904 can selectively indicate acknowledgement 906. The user avatar can selectively indicate acknowledgement 906 by selectively transmitting raw image data or transmitting reference clips of a user. For instance, the computing system can transmit the user avatar 900 as a persistent ambient connection (e.g., the user avatar 900 can be transmitted persistently to selectively indicate a user's semantic status). By persistently selectively transmitting a user's semantic status, the computing system can recreate more spontaneous, ad-hoc interactions among users in a virtual workplace without infringing on their comfort and privacy.

Figure 10:
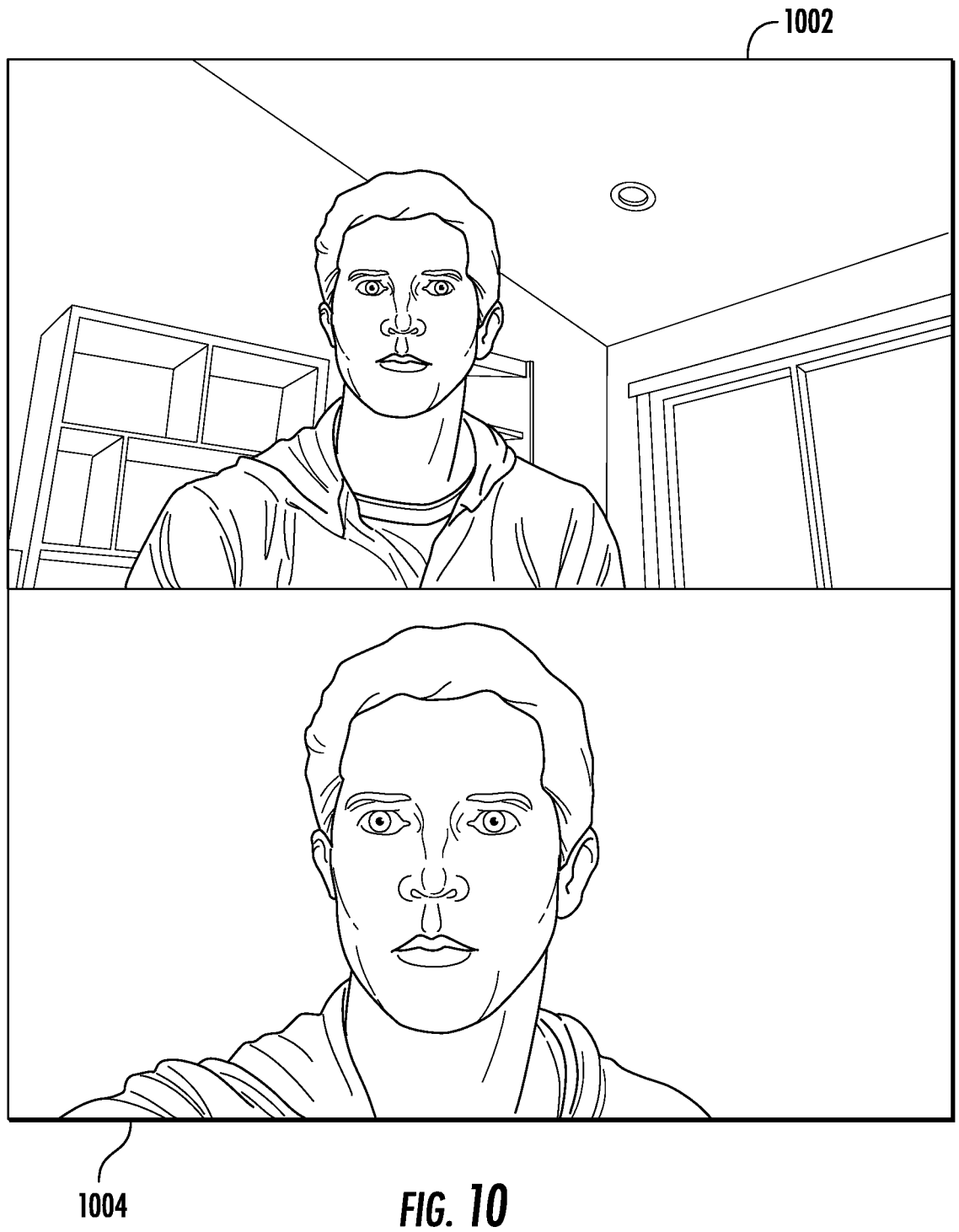
FIG. 10 depicts an example image comprising raw image data and an example generalized video representation that does not comprise raw image data according to example embodiments of the present disclosure.

FIG. 10 illustrates an application of the computing system generating a restricted user videoconference image or video 1004 based on raw image or video footage 1002. For instance, the computing system can generate an altered version of a user to transmit to other videoconference users. In particular, the computing system can generate an image of the user with more flattering lighting and angles or a blurred background. For instance, a raw image or video footage 1002 can be input and desired elements of the raw image or video footage 1002 can be detected (e.g., the attention of the user) and encoded. The desired elements that were detected and encoded can then be reconstructed to output a restricted user videoconference image or video 1004 from the raw image or video footage 1002. As described elsewhere herein, in one example, an encoder portion of a machine-learned image generation model can receive a reference image and encode features of the reference image into a latent representation. A decoder portion of the machine-learned image generation model can obtain the latent representation along with semantic status information (e.g., a semantic status classification and/or keypoint representations) regarding the semantic status of the user. The decoder can generate a generalized representation that has the features of the reference image (e.g., with improved lighting, background, etc.) but that depicts the current semantic status of the user.

ADDITIONAL DISCLOSURE

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for videoconferencing, the computing system comprising:
   one or more processors; and
   one or more non-transitory computer-readable media that collectively store instructions that, when executed by the one or more processors, cause the computing system to perform operations, the operations comprising:
      obtaining data associated with a video stream associated with a user of a videoconferencing system;
      detecting a semantic status of the user within the video stream, wherein the semantic status describes a meaning of an activity of the user relative to a videoconference;
      generating a generalized video representation of the user based on the semantic status of the user, wherein the generalized video representation depicts a generalized representation of the semantic status of the user, and wherein generating the generalized video representation comprises:
         determining a first subset of a plurality of image elements of the video stream as being indicative of the semantic status of the user;
         determining a second subset of the plurality of image elements as being indicative of content unrelated to the semantic status of the user; and
         generating the generalized video representation based on the semantic status of the user, wherein the generalized video representation comprises a generalized representation of each of the first subset of the plurality of image elements, and wherein the generalized video representation excludes a generalized representation of at least some of the second subset of the plurality of image elements; and
      transmitting data descriptive of the generalized video representation to one or more additional computing devices for presentation within the videoconference.

2. The computing system of claim 1, wherein detecting the semantic status of the user further comprises:
   determining an activity status of the user.

3. The computing system of claim 2, wherein generating the generalized video representation of the user comprises:
   generating the generalized video representation of the user based on the semantic status of the user and the activity status of the user, wherein the generalized video representation depicts the generalized representation of the semantic status of the user.

4. The computing system of claim 2, wherein determining the first subset of a plurality of image elements of the video stream as being indicative of the semantic status of the user comprises:
   determining, based on the activity status of the user, the first subset of image elements indicative of the semantic status of the user.

5. The computing system of claim 4, wherein the activity status of the user comprises one of an active participant status or an active listener status.

6. The computing system of claim 4, wherein determining the activity status of the user comprises determining at least one of a mute status of the user, a user-defined availability status, a user calendar status, or a video-inferred status of the user, wherein the mute status of the user comprises a user muted state or a user unmuted status.

7. The computing system of claim 6, wherein the user-defined availability status comprises a user occupied status, a user available status, a user temporarily away status, or a user offline status.

8. The computing system of claim 6, wherein the user calendar status comprises a calendar free status, a calendar unavailable status, or a calendar event scheduled status.

9. The computing system of claim 6, wherein the video-inferred status of the user comprises an automatic determination of user activity based on a presence of detected activity in the video stream or an automatic determination of no user activity based on an absence of detected activity in the video stream.

10. The computing system of claim 1, wherein the video stream associated with the user comprises a plurality of raw image data and the generalized video representation of the user excludes the plurality of raw image data.

11. The computing system of claim 1, wherein detecting the semantic status of the user comprises using a machine-learned image classification model to detect the semantic status of the user.

12. The computing system of claim 1, wherein generating the generalized video representation of the user based on the semantic status of the user comprises comparing the semantic status of the user to a reference database of personalized user images and outputting one or more personalized user images.

13. The computing system of claim 1, wherein generating the generalized video representation of the user based on the semantic status of the user comprises using a machine-learned image generation model to generate the generalized video representation.

14. A computer-implemented method, comprising:
   obtaining, by a computing system comprising one or more processor devices, data associated with a video stream associated with a user of a videoconferencing system;
   detecting, by the computing system, a semantic status of the user within the video stream, wherein the semantic status describes a meaning of an activity of the user relative to a videoconference;
   generating, by the computing system, a generalized video representation of the user based on the semantic status of the user, wherein the generalized video representation depicts a generalized representation of the semantic status of the user, and wherein generating the generalized video representation comprises:
      determining, by the computing system, a first subset of a plurality of image elements of the video stream as being indicative of the semantic status of the user;

determining, by the computing system, a second subset of the plurality of image elements as being indicative of content unrelated to the semantic status of the user; and generating, by the computing system, the generalized video representation based on the semantic status of the user, wherein the generalized video representation comprises a generalized representation of each of the first subset of the plurality of image elements, and wherein the generalized video representation excludes a generalized representation of at least some of the second subset of the plurality of image elements; and transmitting, by the computing system, data descriptive of the generalized video representation to one or more additional computing devices for presentation within the videoconference.

15. The computer-implemented method of claim 14, wherein detecting the semantic status of the user further comprises:

determining, by the computing system, an activity status of the user.

16. The computer-implemented method of claim 15, wherein generating the generalized video representation of the user comprises:

generating the generalized video representation of the user based on the semantic status of the user and the activity status of the user, wherein the generalized video representation depicts the generalized representation of the semantic status of the user.

17. The computer-implemented method of claim 15, wherein determining the first subset of a plurality of image elements of the video stream as being indicative of the semantic status of the user comprises:

determining, by the computing system based on the activity status of the user, the first subset of image elements indicative of the semantic status of the user.

18. The computer-implemented method of claim 17, wherein the activity status of the user comprises one of an active participant status or an active listener status.

19. The computer-implemented method of claim 17, wherein determining the activity status of the user comprises determining at least one of a mute status of the user, a user-defined availability status, a user calendar status, or a video-inferred status of the user, wherein the mute status of the user comprises a user muted state or a user unmuted status.

20. One or more non-transitory computer readable media that collectively store instructions that, when executed by one or more computing devices, causes the one or more computing devices to perform operations, the operations comprising:

obtaining data associated with a video stream associated with a user of a videoconferencing system;

detecting a semantic status of the user within the video stream, wherein the semantic status describes a meaning of an activity of the user relative to a videoconference;

generating a generalized video representation of the user based on the semantic status of the user, wherein the generalized video representation depicts a generalized representation of the semantic status of the user, and wherein generating the generalized video representation comprises:

determining a first subset of a plurality of image elements of the video stream as being indicative of the semantic status of the user;

determining a second subset of the plurality of image elements as being indicative of content unrelated to the semantic status of the user; and generating the generalized video representation based on the semantic status of the user, wherein the generalized video representation comprises a generalized representation of each of the first subset of the plurality of image elements, and wherein the generalized video representation excludes a generalized representation of at least some of the second subset of the plurality of image elements; and transmitting data descriptive of the generalized video representation to one or more additional computing devices for presentation within the videoconference.

\* \* \* \* \*